United States Patent
Okumura et al.

(10) Patent No.: US 11,408,776 B2
(45) Date of Patent: Aug. 9, 2022

(54) POWER SUPPLY DEVICE, AND METHOD FOR DETECTING OPENING OF EXHAUST VALVE OF POWER SUPPLY DEVICE

(71) Applicant: SANYO Electric Co., Ltd., Osaka (JP)

(72) Inventors: Masashi Okumura, Osaka (JP); Tsukasa Masuda, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

(21) Appl. No.: 17/041,018

(22) PCT Filed: Apr. 5, 2019

(86) PCT No.: PCT/JP2019/015052
§ 371 (c)(1),
(2) Date: Sep. 24, 2020

(87) PCT Pub. No.: WO2019/208156
PCT Pub. Date: Oct. 31, 2019

(65) Prior Publication Data
US 2021/0025762 A1    Jan. 28, 2021

(30) Foreign Application Priority Data
Apr. 24, 2018    (JP) .............................. JP2018-083308

(51) Int. Cl.
*H01M 50/317*    (2021.01)
*H01M 50/30*    (2021.01)
(Continued)

(52) U.S. Cl.
CPC ............ *G01K 3/10* (2013.01); *H01M 10/486* (2013.01); *H01M 50/317* (2021.01); *H01M 2200/20* (2013.01)

(58) Field of Classification Search
CPC ..... H01M 50/317; H01M 10/30; H01M 50/20
See application file for complete search history.

(56) References Cited

U.S. PATENT DOCUMENTS

| 5,680,030 A | * | 10/1997 | Kadouchi | ........... H01M 10/647 320/134 |
| 2013/0177791 A1 | * | 7/2013 | Takahashi | ........... H01M 10/633 429/72 |

FOREIGN PATENT DOCUMENTS

| JP | H01-117627 A | 5/1989 |
| JP | H03-291866 A | 12/1991 |

(Continued)

OTHER PUBLICATIONS

Extended (Supplementary) European Search Report dated May 18, 2021, issued in counterpart EP application No. 19792779.1 (7 pages).

(Continued)

*Primary Examiner* — Kenneth J Douyette
(74) *Attorney, Agent, or Firm* — WHDA, LLP

(57) ABSTRACT

Disclosed is a power supply device including a battery having an exhaust valve that opens when an internal pressure becomes higher than a set pressure, the battery being housed in a case, a temperature sensor that detects a temperature in the case, and a detection circuit that detects opening of the exhaust valve at a detected temperature detected by the temperature sensor. In this power supply device, the detection circuit detects that a high temperature time (t1) from a timing at which a rate of rise ($\Delta T/\Delta t$) of the temperature detected by the temperature sensor is higher than a rise rate set value and exceeds the rise rate set value to a timing at which the detected temperature falls to less than or equal to a reference temperature is longer than a high temperature time set value, and detects the opening of the exhaust valve.

6 Claims, 3 Drawing Sheets

(51) Int. Cl.
*H01M 10/48* (2006.01)
*G01K 3/10* (2006.01)

(56) References Cited

FOREIGN PATENT DOCUMENTS

| | | |
|---|---|---|
| JP | H05-326024 A | 12/1993 |
| JP | 2010-055957 | 3/2010 |

OTHER PUBLICATIONS

International Search Report of PCT application No. PCT/JP2019/015052 dated Jun. 11, 2019.

\* cited by examiner

POWER SUPPLY DEVICE, AND METHOD FOR DETECTING OPENING OF EXHAUST VALVE OF POWER SUPPLY DEVICE

CROSS-REFERENCE TO RELATED APPLICATIONS

This application is a U.S. national stage application of the PCT International Application No. PCT/JP2019/015052 filed on Apr. 5, 2019, which claims the benefit of foreign priority of Japanese patent application 2018-083308 filed on Apr. 24, 2018, the contents all of which are incorporated herein by reference.

TECHNICAL FIELD

The present invention relates to a power supply device in which a rechargeable battery is disposed in a case, and relates particularly to a power supply device including an exhaust valve that opens when an internal pressure of the battery rises to an abnormal pressure, and a method for detecting opening of the exhaust valve of the power supply device.

BACKGROUND ART

In a power supply device in which a battery is built in a case, an exhaust valve is provided in the battery in order to prevent an adverse effect such as a rupture of the battery. The exhaust valve detects an internal pressure of the battery and opens. The exhaust valve opens when the internal pressure of the battery becomes higher than a set pressure, and ejects an internal high-pressure gas to prevent a rise of the internal pressure. The internal pressure of the battery rises when the battery is used in an abnormal state. The abnormal state of the battery in which the exhaust valve opens is caused by, for example, a flow of an excessive charging/discharging current or an internal short-circuit of positive and negative electrodes. Since the exhaust valve opens during abnormal use, it is important to detect the open state quickly. A power supply device that detects a temperature and determines whether the exhaust valve opens has been developed. (See PTL 1)

CITATION LIST

Patent Literature

PTL 1: Unexamined Japanese Patent Publication No. 2010-055957

SUMMARY OF THE INVENTION

The device that detects the temperature and determines the opening of the exhaust valve determines the valve opening by detecting the battery temperature and an ambient temperature. Since the battery temperature rises when the exhaust valve opens, the valve opening can be detected by the battery temperature and the ambient temperature. However, the battery temperature fluctuates under external conditions such as the ambient temperature, and also changes with the magnitude of the current that charges and discharges the battery, so that it is difficult to detect the valve opening reliably and quickly. In addition, in the device that determines the opening of the exhaust valve based on the temperature, noise induced in the temperature sensor hinders accurate detection of the temperature, so that this also makes it difficult to detect the opening of the exhaust valve quickly and reliably.

The present invention has been developed for the purpose of eliminating the above-mentioned conventional adverse effects, and an important object of the present invention is to provide a power supply device capable of detecting a temperature and accurately and quickly detecting opening of an exhaust valve, and a method for detecting the opening of the exhaust valve.

A power supply device of the present invention includes battery 1 having an exhaust valve that opens when an internal pressure becomes higher than a set pressure, case 3 that houses battery 1, temperature sensor 5 that detects a temperature in case 3, and detection circuit 7 that detects opening of the exhaust valve at a detected temperature detected by temperature sensor 5, in which it is detected that a high temperature time (t1) from a timing at which a rate of rise ($\Delta T/\Delta t$) of the detected temperature is higher than a rise rate set value and exceeds the rise rate set value to a timing at which the detected temperature falls to less than or equal to a reference temperature is longer than a high temperature time set value, and detection circuit 7 detects the opening of the exhaust valve.

In the power supply device of the present invention, a plurality of temperature sensors 5 are provided in case 3, and detection circuit 7 can detect the opening of the exhaust valve from the temperature detected by each of temperature sensors 5. At least one of the plurality of temperature sensors 5 can be disposed in an exhaust gas path in case 3. Furthermore, at least one of the plurality of temperature sensors can be disposed to be thermally coupled directly or indirectly to battery 1, and thus to detect the battery temperature.

In the power supply device of the present invention, detection circuit 7 detects that a rising time (t2) from a timing at which the rate of rise ($\Delta T/\Delta t$) of the detected temperature is higher than a set rate to a timing at which the rate of rise ($\Delta T/\Delta t$) falls to less than or equal to the set rate exceeds a rising time set value and can detect the opening of the exhaust valve.

In the power supply device of the present invention, temperature sensor 5 can also be used as temperature sensor 5 that detects the battery temperature.

A method for detecting opening of an exhaust valve of a power supply device of the present invention is a method for detecting opening of an exhaust valve of a power supply device including battery 1 having an exhaust valve that opens when an internal pressure becomes higher than a set pressure, case 3 that houses battery 1, and temperature sensor 5 that detects a temperature in case 1, and the method includes detecting a rate of rise ($\Delta T/\Delta t$) of the detected temperature detected by temperature sensor 5, detecting a high temperature time (t1) from when the rate of rise exceeds a rise rate set value to when the rate of rise falls to less than or equal to a reference temperature, and determining that the exhaust valve has opened in a state in which the rate of rise ($\Delta T/\Delta t$) is larger than the preset rise rate set value and the high temperature time (t1) is longer than a high temperature time set value.

In the method for detecting opening of an exhaust valve of a power supply device of the present invention, temperatures at a plurality of measurement points are detected by a plurality of temperature sensors 5 disposed in case 3, and when it is detected that the rate of rise ($\Delta T/\Delta t$) of the temperature detected by any of temperature sensors 5 and the high temperature time (t1) exceed the set values, it can be determined that the exhaust valve has opened.

In the method for detecting opening of an exhaust valve of a power supply device of the present invention, it is detected that a rising time (t2) from a timing at which the rate of rise ($\Delta T/\Delta t$) of the detected temperature is higher than a set rate to a timing at which the rate of rise ($\Delta T/\Delta t$) falls to less than or equal to the set rate exceeds a rising time set value, and it can be determined that the exhaust valve has opened.

In the method for detecting opening of an exhaust valve of the present invention, temperature sensor 5 can also be used as temperature sensor 5 that detects the battery temperature.

The power supply device and the method for detecting opening of an exhaust valve of a power supply device of the present invention are characterized in that a temperature is detected and the opening of the exhaust valve can be detected accurately and quickly. In particular, in the power supply device and the valve opening detection method described above, in addition to the rate of rise ($\Delta T/\Delta t$) of the temperature detected by the temperature sensor, the high temperature time (t1) from when the rate of rise ($\Delta T/\Delta t$) of the detected temperature exceeds the rise rate set value to when the detected temperature falls to less than or equal to the reference temperature is detected, and it is also detected that the high temperature time (t1) exceeds the high temperature time set value to detect the opening of the exhaust valve, so that there is a feature that the opening of the exhaust valve can be accurately detected by ignoring an influence of noise induced in the temperature sensor. Although the temperature sensor can detect, for example, the battery temperature in the case with a simple circuit configuration, the influence of noise induced in the temperature sensor cannot be eliminated. The noise of the temperature sensor is induced from a power supply circuit such as a switching power supply via a power supply line, and is further induced as radiation noise from various switching circuits. Since a detection voltage of the temperature sensor fluctuates due to both the detected temperature and noise, the voltage fluctuation due to noise causes an error in the detected temperature. Complete removal of noise is extremely difficult, and errors in the detected temperature due to noise hinder accurate detection of the opening of the exhaust valve.

The power supply device and the valve opening detection method of the present invention can accurately detect the opening of the exhaust valve even when the detected temperature fluctuates due to noise. This is because the power supply device and the valve opening detection method described above detect the opening of the exhaust valve with both the rate of rise ($\Delta T/\Delta t$) of the temperature and the high temperature time (t1) to when the temperature falls. When the exhaust valve opens and high-temperature exhaust gas is ejected from the battery, the temperature inside the case rises rapidly. In addition, after the temperature rises, it takes time for the temperature to fall to the reference temperature, and the time to when the temperature falls is considerably longer than a noise cycle. Thus, the rate of rise ($\Delta T/\Delta t$) is compared with the rise rate set value. In addition, the high temperature time (t1) to when the temperature falls to the reference temperature is compared with the high temperature time set value, and it is detected that both the rate of rise and the high temperature time exceed the set values, so that malfunctions due to noise that fluctuates in a short cycle are eliminated, and the opening of the exhaust valve is reliably detected.

DESCRIPTION OF EMBODIMENT

Figure 1:
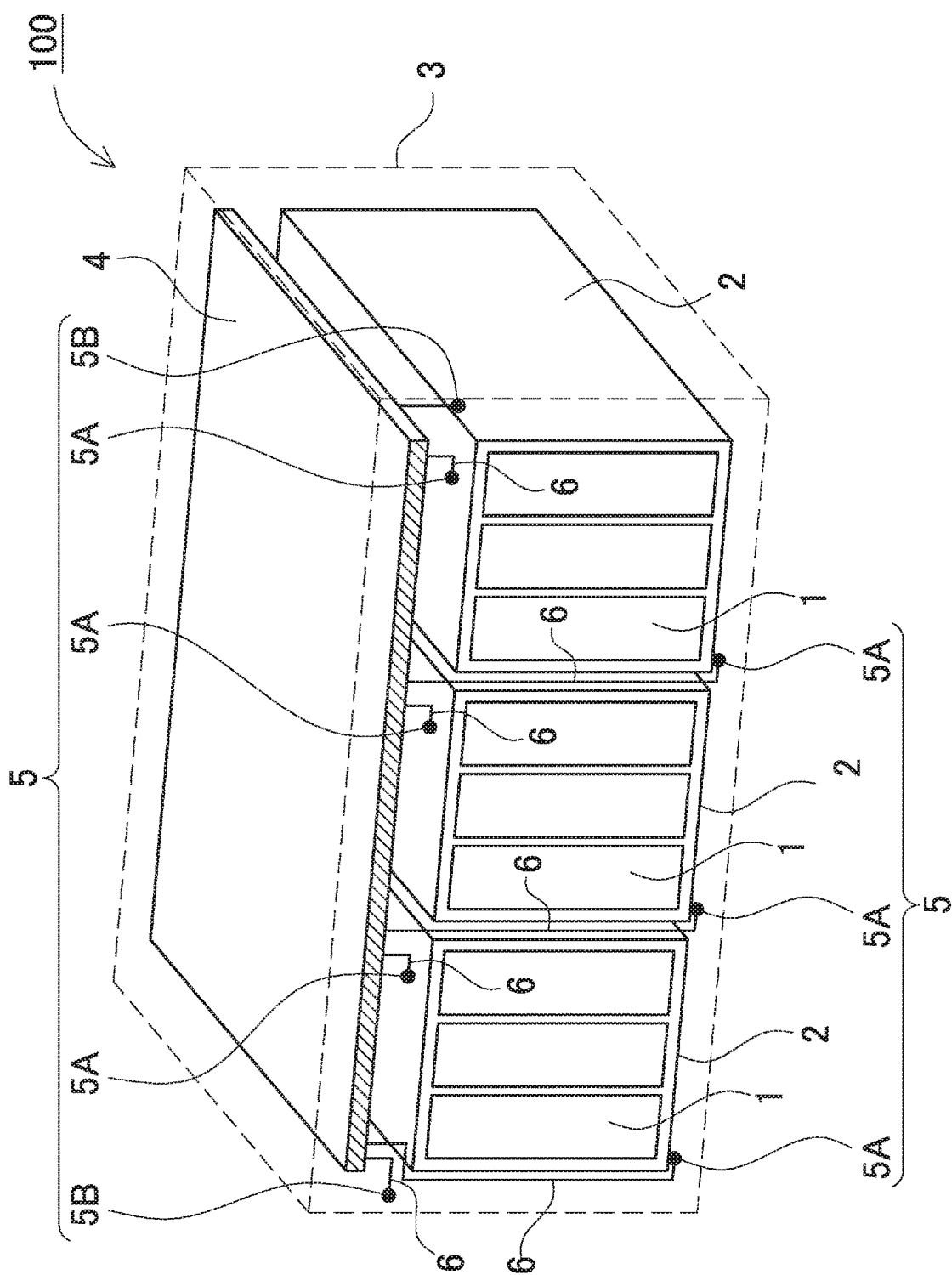
FIG. 1 is a schematic perspective view of a power supply device according to an exemplary embodiment of the present invention.

Hereinafter, the present invention will be described in detail with reference to the drawings. In the description below, the terms indicative of specific directions or positions (e.g., "upper", "lower", and other words including these words) are used as appropriate. The use of these terms is to make the understanding of the present invention easy with reference to the drawings, and does not limit the technical scope of the present invention by their meanings. The parts indicated with the same reference characters represented in a plurality of the drawings denote the same or equivalent parts or members.

In addition, the exemplary embodiment described below exemplifies a power supply device and a method for detecting opening of an exhaust valve of the power supply device for embodying the technical idea of the present invention, and it is not intended to limit the present invention to the following exemplary embodiment. Unless specifically stated otherwise, the dimensions, materials, shapes and relative arrangements, among others, of the components described below do not intend to limit the scope of the present invention to these dimensions, materials, shapes, and relative arrangements, etc., and intended to exemplify. Moreover, details described in one embodiment and one Example are also applicable to another embodiment and another Example. Furthermore, the sizes, positional relationship, and the like of members shown in the drawings may be exaggerated for clarity.

The power supply device of the present invention is optimal for a large-capacity power supply in which a large number of batteries are built in a case, for example, a backup power supply, and is used for various other applications such as a power supply device for a vehicle that supplies electric power to a traveling motor of a bicycle or a vehicle.

Figure 2:
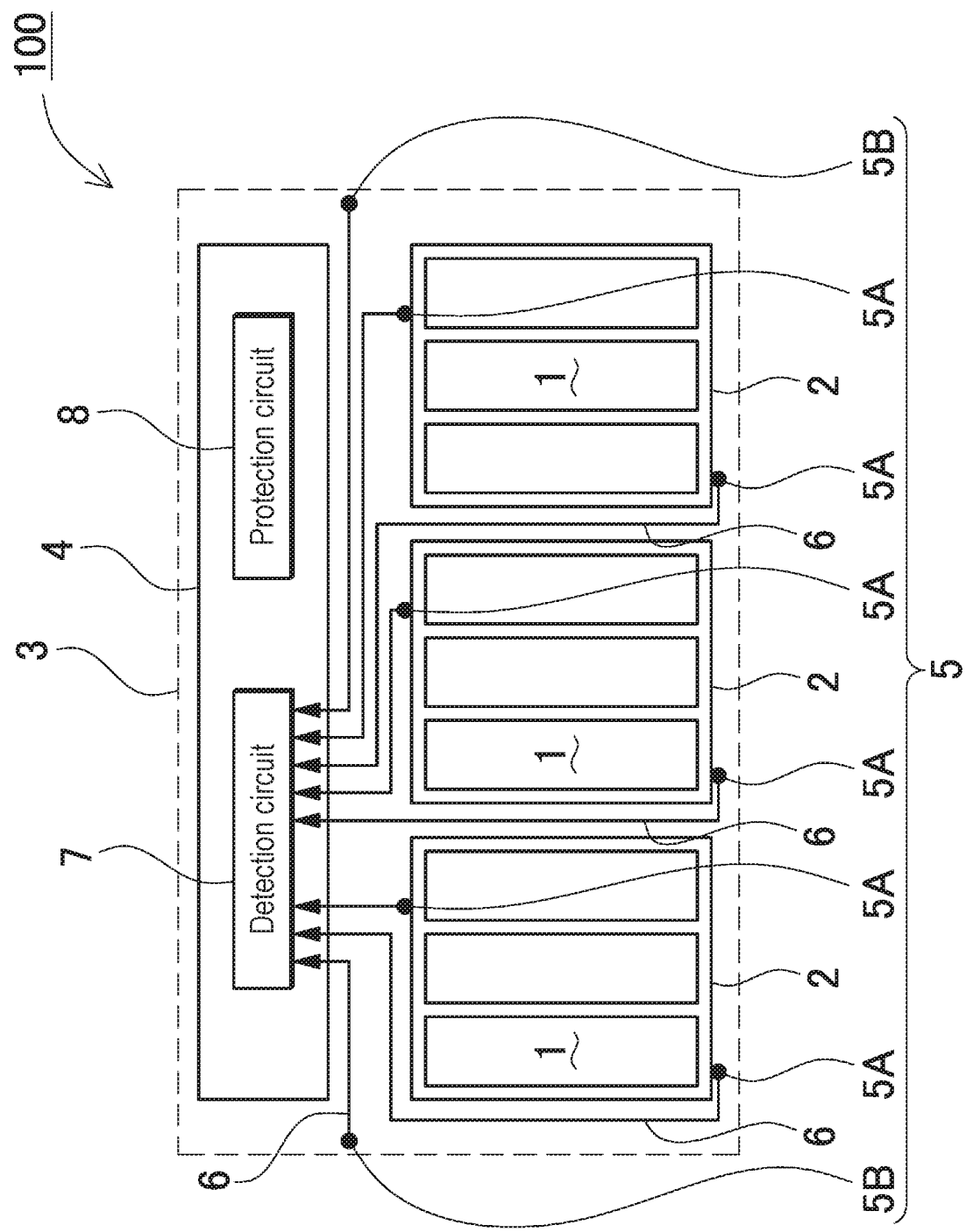
FIG. 2 is a schematic configuration diagram of the power supply device according to the exemplary embodiment of the present invention.

Power supply device 100 shown in the schematic diagrams of FIGS. 1 and 2 has a plurality of batteries 1 incorporated as battery unit 2 in case 3. Case 3 contains battery unit 2, circuit board 4, and temperature sensor 5 connected to circuit board 4. In battery unit 2, a plurality of rechargeable batteries 1 are connected in series or in parallel via a lead plate (not shown) of a metal sheet and connected in a block shape.

Battery 1 is a cylindrical battery or a prismatic battery. In battery 1, an electrode and an electrolyte solution are housed in a metal case having a sealed structure. In the metal case, an opening of an exterior can whose bottom is closed is airtightly fixed by a sealing plate. The exterior can is produced by pressing a metal sheet. The sealing plate is airtightly fixed by caulking at a peripheral edge of the opening of the exterior can through a packing.

Although not shown, battery 1 is provided with an exhaust valve in order to prevent the metal case having a sealed structure from being damaged when an internal pressure of the metal case rises. The exhaust valve is provided on the sealing plate or on a bottom surface of the exterior can. The exhaust valve opens when the internal pressure becomes higher than a set pressure, for example, 1.5 MPa, and prevents the metal case from being broken due to the rise of the internal pressure. The exhaust valve is opened in an abnormal state. Therefore, the temperature of battery 1 is also very high when the exhaust valve opens. Thus, a gas and an electrolyte solution (ejected substance) ejected from the exhaust valve that opens become abnormally high temperature exhaust gases. Particularly, in a battery device in which battery 1 is a lithium ion battery, exhaust gas has an abnormally high temperature. In addition, since the lithium ion battery is filled with a nonaqueous electrolyte solution, this becomes a combustion gas discharged at a high temperature, which may cause a more abnormally high temperature. Even in not only the lithium ion battery but also other rechargeable batteries, the exhaust valve opens in an abnormal use state, so that exhaust gas has an abnormally high temperature.

Case 3 is made of metal or plastic, has a sealed structure or a structure that is closed but not sealed, and is provided with an exhaust port (not shown) for discharging the exhaust gas discharged from battery 1 to the outside. In case 3 having the exhaust port, the exhaust gas ejected from battery 1 is discharged to the outside through the exhaust port. However, case 3 having a sealed structure or a closed structure does not necessarily have to be provided with a specific exhaust port, but may be provided with a partial gap to have a structure in which the exhaust gas is discharged to the outside through this gap.

In power supply device 100 of FIG. 1, case 3 has a rectangular box shape as a whole, and battery unit 2 and circuit board 4 are disposed inside case 3. In the power supply device of FIG. 1, three sets of battery units 2 are disposed in case 3. However, the power supply device of the present invention does not specify the number of batteries 1 housed in case 3 and the connection state.

Circuit board 4 is connected to temperature sensor 5 via lead wire 6. Temperature sensor 5 detects the temperature of a specific portion in case 3 and detects that the exhaust valve of battery 1 has opened. It is important for the power supply device in which a plurality of batteries 1 are built in case 3 to accurately detect the opening of the exhaust valve even when the exhaust valve of any of batteries 1 has opened. In power supply device 100 of FIGS. 1 and 2, a plurality of temperature sensors 5 are disposed in case 3, and power supply device 100 detects the opening of the exhaust valve from the temperature detected by every temperature sensors 5. The power supply device of FIGS. 1 and 2 is provided with temperature sensor 5A that detects the battery temperature and temperature sensor 5B that detects the temperature of the exhaust gas ejected from the exhaust valve that opens.

Temperature sensor 5A that detects the battery temperature is disposed to be thermally coupled directly or indirectly to battery 1 constituting battery unit 2. Battery unit 2 in which batteries 1 are connected in series or in parallel via the lead plate of the metal sheet may be disposed such that temperature sensor 5A is thermally coupled to the lead plate, and may be disposed to be thermally coupled to battery 1 via the lead plate. Since the lead plate is connected to the plurality of batteries 1, temperature sensor 5A thermally coupled to battery 1 via the lead plate can quickly detect the temperature of the plurality of batteries 1 connected with the lead plate. However, temperature sensor 5A can also be disposed by being thermally coupled to a surface of a battery case. In illustrated power supply device 100, a plurality of temperature sensors 5A that detect the battery temperature are disposed on an upper surface and a lower surface of battery unit 2. Each temperature sensor 5A detects the temperature of battery 1 thermally coupled. In illustrated power supply device 100, the number of temperature sensors 5A is smaller than the number of batteries 1, and the temperature of specific battery 1 is detected. Power supply device 100 is designed such that each battery 1 is charged and discharged with the same current to reduce a temperature difference, so that the temperature of specific battery 1 is detected without detecting all the battery temperatures. Since power supply device 100 detects the battery temperature in order to protect battery 1, for example, power supply device 100 detects the temperature of battery 1 in which a temperature change is large to allow battery 1 to be charged and discharged while protecting battery 1. However, the power supply device can detect the temperature by thermally coupling temperature sensors 5A to all batteries 1.

Temperature sensor 5B that detects the temperature of the exhaust gas is disposed between battery units 2 and between battery unit 2 and an inner surface of case 3 in a passage of the exhaust gas discharged from battery 1. In power supply device 100 of FIGS. 1 and 2, temperature sensor 5B that detects the temperature of the exhaust gas is disposed between battery unit 2 and case 3. Temperature sensor 5B detects the temperature of the exhaust gas flowing along the inner surface of case 3 to detect the opening of the exhaust valve. Temperature sensor 5B for exhaust gas is disposed by being thermally coupled to battery 1, so that temperature sensor 5B can also be used as temperature sensor 5A that detects the temperature of battery 1.

Circuit board 4 is mounted with detection circuit 7 connected to temperature sensor 5 via lead wire 6 to detect the opening of the exhaust valve, and protection circuit 8 connected to battery 1 to control charging/discharging of battery 1. Detection circuit 7 detects the temperature of the battery in case 3 and the temperature of the gas passage to detect the opening of the exhaust valve. When the exhaust valve is opened, high temperature exhaust gas is ejected into case 3. Therefore, the detection of the exhaust valve can be determined by detecting the temperature in case 3. However, the temperature in case 3 fluctuates even under conditions other than the opening of the exhaust valve and, for example, fluctuates with an ambient temperature of case 3 and a current value for charging/discharging battery 1. Thus, even when the exhaust valve does not open, if the ambient temperature rises or the current for charging/discharging battery 1 increases, the temperature in case 3 rises. The temperature in case 3 rises as the exhaust valve opens, and also rises due to the ambient temperature and the charging/discharging current, so that when the opening of the exhaust valve is determined by comparing the temperature in case 3 with a set value, accurate detection cannot be performed. This is because even when the exhaust valve does not open, if the ambient temperature is high and the charging/discharging current increases, the temperature in case 3 rises.

In order to overcome the drawback that the rise of the temperature due to the ambient temperature and the charging/discharging current makes it difficult to accurately determine the opening of the exhaust valve, the power supply device determines the opening of the exhaust valve by comparing a rate of rise of the detected temperature, that is, a rate of rise ($\Delta T/\Delta t$) of the temperature with a preset rise rate set value, instead of comparing the temperature detected by temperature sensor 5 with the set value. However, although the temperature detected by temperature sensor 5 rises when the exhaust valve opens, the detected temperature also rises due to noise induced in temperature sensor 5, so that if the opening of the exhaust valve is determined only by the rate of rise ($\Delta T/\Delta t$), malfunctions due to noise occur.

In order to identify a fluctuation of the temperature detected by temperature sensor 5 due to noise and a fluctuation of the detected temperature due to the opening of the exhaust valve, the power supply device compares a time from when the rate of rise ($\Delta T/\Delta t$) of the detected temperature exceeds the rise rate set value and further exceeds the rise rate set value to when the rate of rise ($\Delta T/\Delta t$) falls to less than or equal to a preset reference temperature, that is, a high temperature time (t1) when the exhaust valve opens and the temperature rises with a high temperature time set value and determines that the exhaust valve opens only when the rate of rise ($\Delta T/\Delta t$) is larger than the rise rate set value and, in addition, the high temperature time (t1) is longer than the high temperature time set value.

Detection circuit 7 that detects the opening of the exhaust valve with both the rate of rise ($\Delta T/\Delta t$) of the temperature and the high temperature time (t1) stores the rise rate set value and the high temperature time set value in a memory. The rise rate set value, the high temperature time set value, and the reference temperature forcibly cause thermal runaway of one battery 1 in case 3 to open the exhaust valve, measure the temperature detected by temperature sensor 5, and further measure noise induced in temperature sensor 5, and thus to be set to a value capable of accurately determining the opening of the exhaust valve without being affected by the noise.

Figure 3:
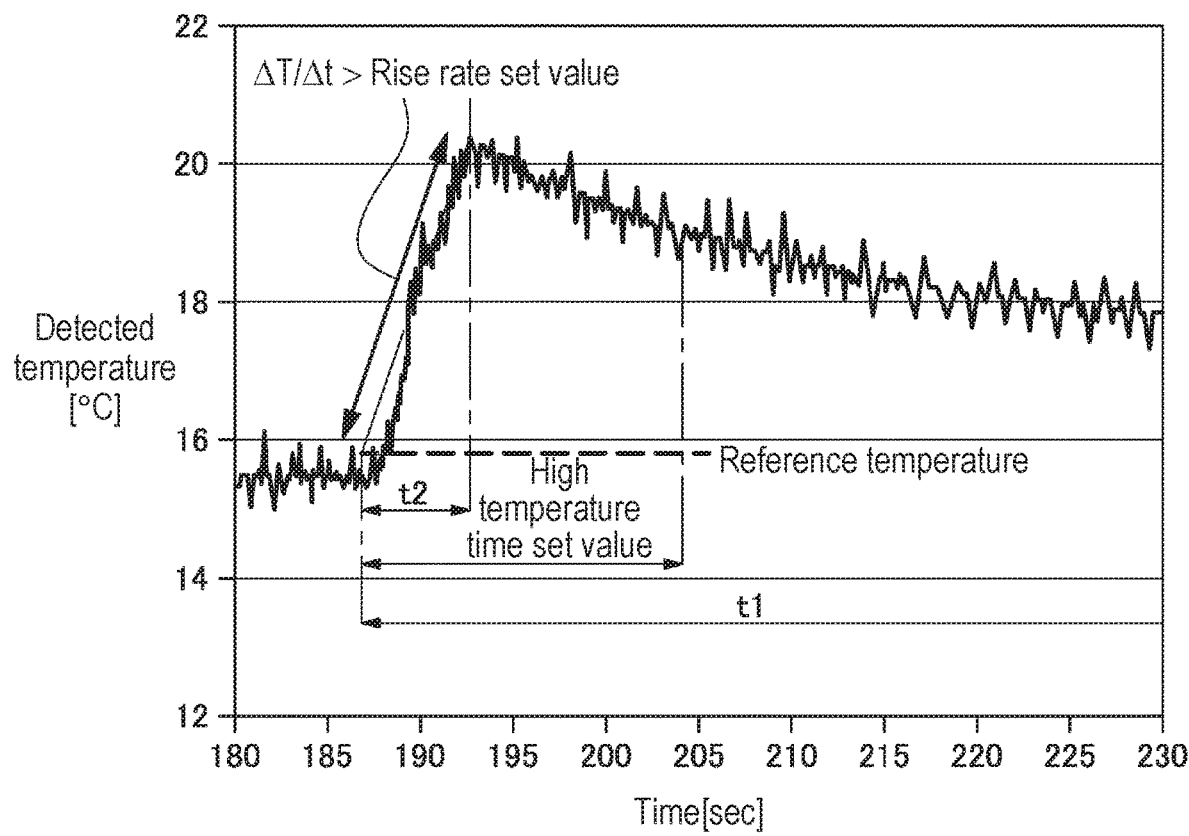
FIG. 3 is a graph showing a state in which a temperature detected by a temperature sensor changes when an exhaust valve opens.
Figure 4:
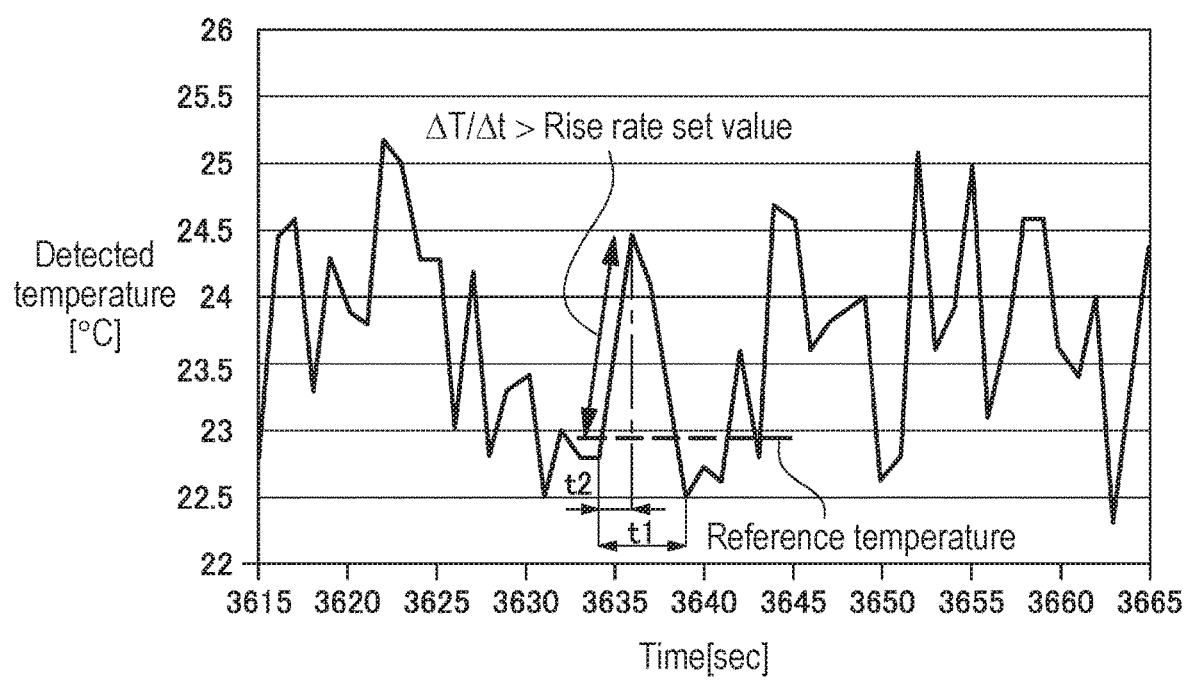
FIG. 4 is a graph showing a state in which the detected temperature changes due to noise induced in the temperature sensor when the exhaust valve does not open.

FIG. 3 shows a state in which the temperature detected by temperature sensor 5 changes when the exhaust valve opens. FIG. 4 shows a state in which the detected temperature changes due to noise induced in temperature sensor 5 when the exhaust valve does not open. In these figures, the horizontal axis is a time axis, and the vertical axis is the temperature detected by temperature sensor 5. Temperature sensor 5 uses an element whose electrical resistance changes with a temperature, such as a thermistor, and detection circuit 7 detects the temperature by converting the electric resistance of temperature sensor 5 into a voltage. In FIGS. 3 and 4, the temperature detected by temperature sensor 5 fluctuates up and down due to noise. In these figures, the temperature is detected and plotted in a predetermined detection cycle. The detection cycle is set to, for example, 100 msec to 500 msec such that the temperature change can be detected quickly. In addition, in order to improve temperature detection accuracy, detection circuit 7 detects the temperature in a cycle shorter than the set cycle, for example, a sampling cycle of 5 msec to 10 msec, and averages a plurality of detected temperatures detected in the sampling cycle to calculate the temperature change in the set cycle.

As shown in FIG. 3, the temperature detected by temperature sensor 5 in which noise is induced changes up and down, the detected temperature rises when the exhaust valve opens, and the detected temperature also rises due to noise. In order to accurately detect the opening of the exhaust valve while ignoring the influence of noise, detection circuit 7 sets the rise rate set value, the high temperature time set value, and the reference temperature. The rise rate set value is set to, for example, 1° C./sec in order to reliably detect the temperature rise due to the opening of the exhaust valve. For the high temperature time set value and the reference temperature, in consideration of a state from the opening of the exhaust valve to the fall of the temperature, for example, the high temperature time set value is set to 20 sec, and the reference temperature is set to the detected temperature when the rate of rise ($\Delta T/\Delta t$) exceeds the rise rate set value. If the rise rate set value and the high temperature time set value are too small, the influence of noise is likely to be exerted. On the contrary, if these values are too large, it becomes impossible to accurately detect the opening of the exhaust valve. After the exhaust valve opens, the rate of rise of the temperature and the state of the fall of the temperature change depending on an internal volume of case 3, the type and size of battery 1, the number and disposition of batteries 1, the disposed location of temperature sensor 5, etc., so that the rise rate set value, the high temperature time set value, and the reference value are set to values that reliably detect the opening of the exhaust valve while the exhaust valve opens.

Detection circuit 7 does not necessarily need to set the rise rate set value for 1 sec, and can store the rate of rise of the temperature in a time period shorter than 1 sec or a time period more than or equal to 1 sec. For example, detection circuit 7 that stores the rise rate set value for 2 sec compares the rate of rise ($\Delta T/\Delta t$) for 2 sec with the rise rate set value to determine the opening of the exhaust valve.

Furthermore, in addition to the rate of rise ($\Delta T/\Delta t$), the high temperature time (t1), and the reference temperature, detection circuit 7 compares a rising time (t2) from a timing at which the rate of rise ($\Delta T/\Delta t$) of the detected temperature is higher than a set rate to a timing at which the rate of rise ($\Delta T/\Delta t$) falls to less than or equal to the set rate with the rising time set value, and detects that the rising time (t2) also exceeds the rising time set value to determine the opening of the exhaust valve, so that the opening of the exhaust valve can be determined more accurately. The rising time set value is set to, for example, 1 sec to 2 sec. However, the rising time set value also changes depending on the internal volume of case 3, the type and size of battery 1, the number and disposition of batteries 1, the disposed location of temperature sensor 5, etc., so that the rising time set value is set to a value capable of reliably determining the opening of the exhaust valve without being affected by noise.

Power supply device 100 of FIGS. 1 and 2 includes the plurality of temperature sensors 5. Power supply device 100 determines that the exhaust valve has opened in the state in which the rate of rise ($\Delta T/\Delta t$) of the temperature detected by any of temperature sensors 5 is larger than the rise rate set value and the high temperature time (t1) is longer than the high temperature time set value and the state in which the rising time (t2) is longer than the rising time set value, and the opening of the exhaust valve can be quickly and accurately determined. In addition, a power supply device including the plurality of temperature sensors 5 can determine the opening of the exhaust valve by providing each of temperature sensors 5 with the rise rate set value, the high temperature time set value, and the rising time set value separately.

INDUSTRIAL APPLICABILITY

The present invention is effectively used for a power supply device in which a plurality of batteries each of which includes an exhaust valve are disposed in a case.

REFERENCE MARKS IN THE DRAWINGS

100: power supply device
1: battery
2: battery unit
3: case
4: circuit board
5, 5A, 5B: temperature sensor
6: lead wire
7: detection circuit
8: protection circuit

The invention claimed is:

1. A power supply device comprising:
a battery having an exhaust valve that opens when an internal pressure becomes higher than a set pressure;
a case that houses the battery;
a temperature sensor that detects a temperature in the case; and
a detection circuit that detects opening of the exhaust valve at a detected temperature detected by the temperature sensor,
wherein the detection circuit detects the opening of the exhaust valve by detecting that:
a rate of rise ($\Delta T/\Delta t$) of the detected temperature is higher than a rise rate set value; and
a high temperature time (t1) from a timing at which the rate of rise ($\Delta T/\Delta t$) of the detected temperature exceeds the rise rate set value to a timing at which the detected temperature falls to less than or equal to a reference temperature is longer than a high temperature time set value.

2. The power supply device according to claim 1, wherein a plurality of the temperature sensors are provided in the case, and the detection circuit detects the opening of the exhaust valve from the detected temperature of each of the plurality of the temperature sensors.

3. The power supply device according to claim 2, wherein at least one of the plurality of the temperature sensors is disposed in an exhaust gas path in the case.

4. The power supply device according to claim 2, wherein at least one of the plurality of the temperature sensors is disposed to be thermally coupled directly or indirectly to the battery.

5. The power supply device according to claim 1, wherein the detection circuit detects the opening of the exhaust valve by detecting that a rising time (t2) from a timing at which the rate of rise ($\Delta T/\Delta t$) of the detected temperature is higher than a set rate to a timing at which the rate of rise ($\Delta T/\Delta t$) falls to less than or equal to the set rate exceeds a rising time set value.

6. The power supply device according to claim 1, wherein any of the plurality of the temperature sensors detects a battery temperature.

* * * * *